May 18, 1954
T. A. ST. CLAIR
2,678,799
QUICK CLOSING VALVE
Filed Jan. 2, 1948
2 Sheets-Sheet 1
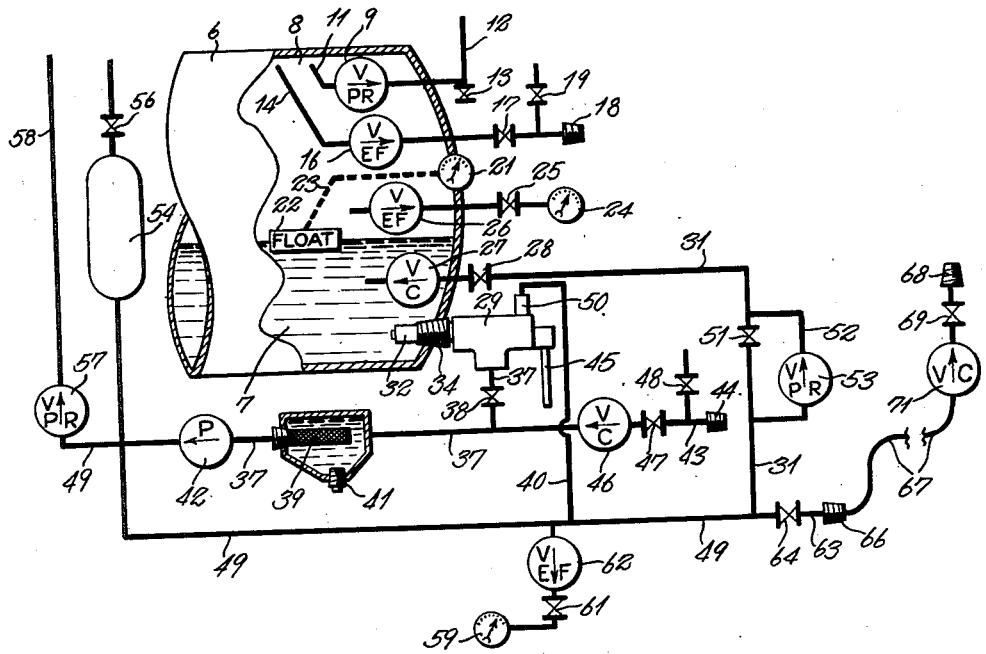
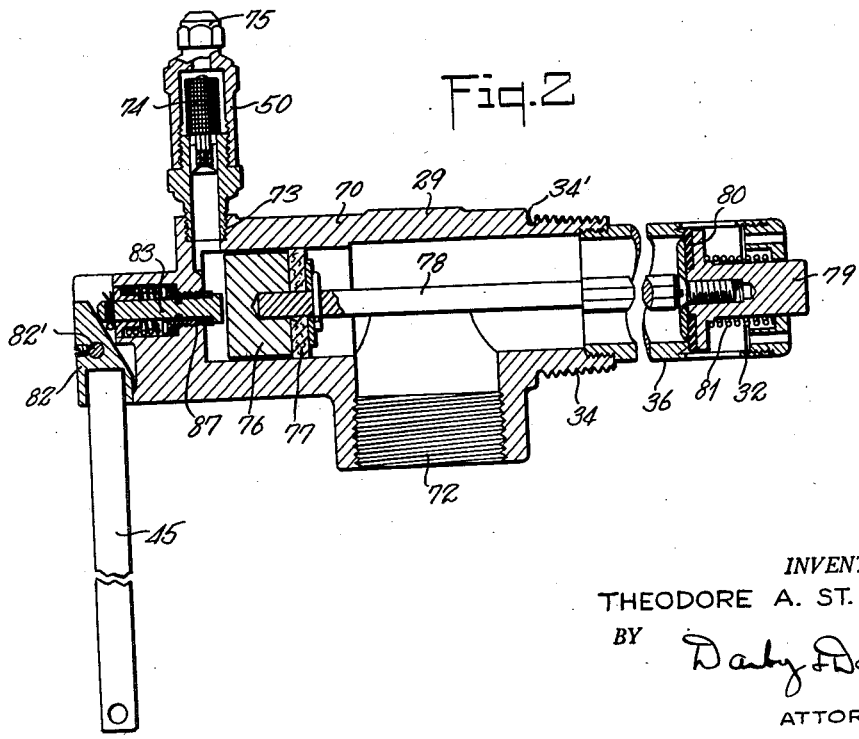
INVENTOR.
THEODORE A. ST. CLAIR
BY Danby & Danby
ATTORNEYS May 18, 1954
T. A. ST. CLAIR
2,678,799
QUICK CLOSING VALVE
Filed Jan. 2, 1948
2 Sheets-Sheet 2
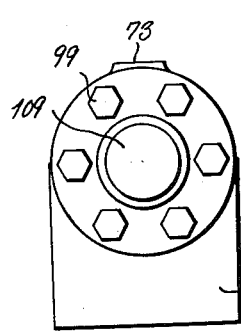
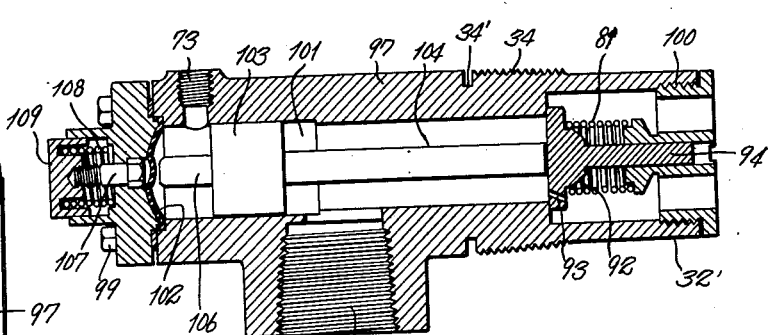
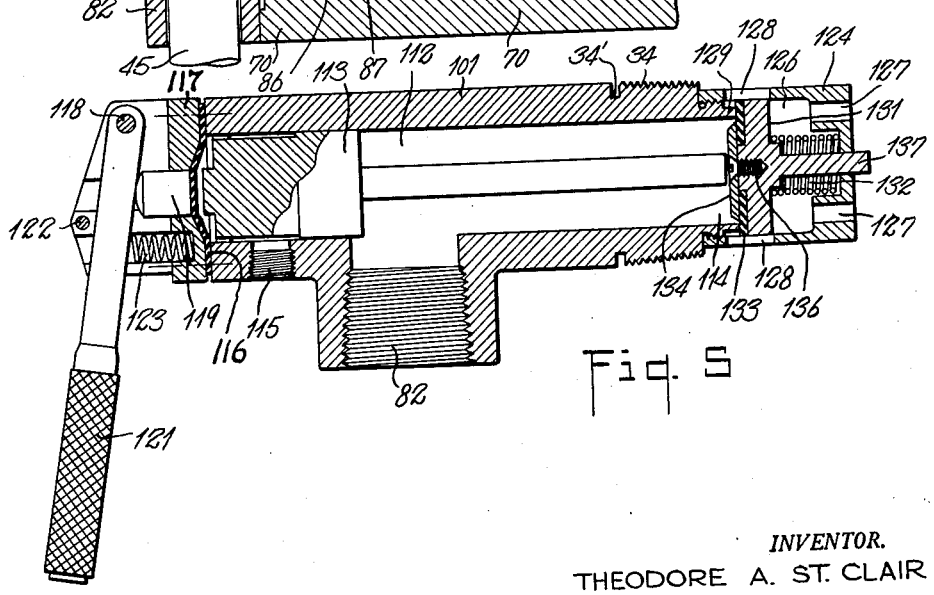
INVENTOR.
THEODORE A. ST. CLAIR
BY
ATTORNEYS Patented May 18, 1954

2,678,799

UNITED STATES PATENT OFFICE 2,678,799

QUICK CLOSING VALVE

Theodore Altamont St. Clair, Bartlesville, Okla., assignor to Phillips Petroleum Company, a corporation of Delaware Application January 2, 1948, Serial No. 185

1 Claim. (Cl. 251—14)

This invention relates to quick closing valves suitable for use in systems for handling liquefied petroleum gases in which system liquefied gases are pumped into a storage tank and out of said tank when dispensing them.

From the standpoint of safety it is essential that all connections to liquefied petroleum gas containers be protected as much as possible from the results of mechanical damage. Under a few special circumstances it is entirely possible to assemble the various tank outlets with their valves and fittings into a relatively small area and protect the assembly with a heavy guard. However, on most mobile and on some stationary equipment it is necessary to have pipe lines located in areas which are vulnerable to breakage through collision. It is standard practice in the industry, and in many cases required by regulations, to equip each and every connection to the tank with the exception of the safety relief valve with either an excess flow valve which will automatically close when a certain predetermined flow is reached or a back flow check valve which is normally closed and which can only be opened when the pressure in the line is substantially greater than the presure in the tank. Obviously when back flow check valves are recessed well within the tank proper so that they will not in themselves be damaged, very adequate protection against line breakage is afforded. However, excess flow valves are normally open and can only be closed when a certain predetermined flow is reached. There are a number of practical obstacles which might limit the flow through an excess flow valve and prevent its proper functioning. These can all be resolved to terms of pressure drop. For instance, a given flow will produce a given pressure drop through the excess flow valve and the tubing. Should the differential pressure between the tank and atmosphere be less than the pressure drop in the line the excess flow valve will not close but will continue to flow whatever amount this differential pressure will permit. Even with a relatively high tank pressure, a small break in a line might not permit an excess flow valve to function since the pressure drop across the point of breakage might too greatly limit the flow.

The above remarks have been made in the "conditional" sense, but these failures recur all too frequently. The intent of the present invention is to provide a normally closed valve which is open only when pumping is in progress, when connections are intact and much less subject to breakage, but which will quickly close under abnormal conditions of undesired flow.

The general object of this invention is to provide in several forms a suitable quick closing valve for use in such systems.

Other and more detailed objects of the invention will be apparent from the disclosure of several embodiments thereof.

This application is a continuation in part of my copending application Serial No. 598,812, filed June 11, 1945, entitled Quick Closing Valve and Storage Tank Containing Same, which issued on January 23, 1951, as Patent No. 2,538,806.

This invention resides substantially in the combination, construction, arrangement and relative location of parts, all as will be described in detail below.

In the accompanying drawings,

Figure 1 is a diagrammatic, elevational view with parts broken away of a storage tank and liquid handling system employing the quick closing valve of this invention;

Figure 2 is a longitudinal, central, cross-sectional view of one form of quick closing valve in accordance with this invention;

Figure 3 is a similar view of another form of quick closing valve in accordance with this invention;

Figure 4 is a lefthand end elevational view of this valve;

Figure 5 is a longitudinal, central, cross-sectional view of still another form of quick closing valve in accordance with this invention; and Figure 6 is an enlarged cross-sectional view of the manual operator for the valve of Figure 2.

In order to fully understand the functions and advantages of the quick closing valves herein claimed a description of the system of Figure 1 in which such valves are used is deemed necessary.

Referring to Figure 1, the tank 6 is provided for storing liquefied gas 7 and such vapors 8 as may be released therein. As illustrated tank 6 may be provided with a vapor pressure relief valve 9 preferably located so as to draw vapor from the vapor space of the tank through line 11 whenever the pressure in the tank exceeds a predetermined safe value, and vent this vapor through line 12 to the atmosphere. A drain valve 13 may be provided to drain away any liquids which may collect in line 12. Vapor may also be withdrawn from or added to the vapor space 8 by line 14 through an excess flow valve 16 and a shut-off valve 17 which may lead to another tank (not shown) connected to coupling 18. Before disconnecting coupling 18 it is customary to bleed off the gas between valve 17 and coupling 18 through the bleed valve 19 provided for this purpose. Tank 6 may also be provided with any suitable type of liquid level gauge 21, the type shown being a magnetic type gauge for which there is no opening through the tank wall. Instead in the wall of the tank is a brass plate through which float 22 transmits the level of liquid 7 by means of a linkage 23 which includes the permanent magnet the field of which moves the steel indicating needle of gauge 21 through the brass plate (not shown). When any other type of liquid level gauge is used the usual protective devices commonly employed therewith would be used. The pressure in tank 6 may be measured by a pressure gauge 24 in the line, to which may be provided the usual shut-off valve 25 and the usual excess flow valve 26.

Valves 9, 16, 26 and 27 (to be referred to later) are shown inside of tank 6 and they are actually mounted inside this tank or in a wall pocket of the tank so that they cannot be sheared off or otherwise damaged. It is also customary to provide a protective housing or guard ring (not shown) for such exterior elements as valves 13, 17, 25 and 28 and 29 (to be referred to later), but this protective housing may be eliminated, and has therefore not been shown.

A pressure relief valve such as the valve 9 is of the type that permits transmission of fluid therethrough when a predetermined differential pressure exists across the valve. The excess flow valve 16 may be like the valve of Figure 1 of United States patent to Thomas No. 2,121,936 granted June 28, 1938, or any standard excess flow valve. It remains open until a predetermined rate of flow exists through it, whereupon it closes. Some excess flow valves shut off the flow completely but may have a bleed passage allowing very minute flow for pressure equalization so that the spring may reopen the valve. The check valve 27 permits flow in one direction only, as indicated by the arrow.

The elements 9 to 26 inclusive do not form any part of the invention herein claimed but may be employed advantageously in systems of this type for which the valves herein disclosed have been devised.

When the modification of such systems which employ a liquid return line is used there is preferably included in this liquid return line 31 the check valve 27 and the cut-off valve 28. The valves of this invention may be used in modifications of this system where a liquid return line 31 is not employed, in which case, of course, valves 27 and 28 are eliminated.

A manually operated and quick closing valve combination 29, 32, several modifications of which are herein disclosed, is mounted in the wall of tank 6 by means of the threaded coupling 34 which in the valves illustrated forms an integral part of this valve.

Before completing the description of the system of Figure 1 a detailed description of the structures of Figures 2 and 6 is desirable. The quick closing valve 29, 32 comprises a housing 29 of which the threaded extension provides the coupling member 34 by means of which this valve is mounted in the tank wall. This threaded extension 34 is joined to the housing 70 by a portion 34' of reduced diameter providing a point of structural weakness such that accidental forces large enough to shear the housing 70 from the threaded portion 34 will cause breakage at the groove 34' without injury or rendering inoperative the quick closing portion 32 of the valve which projects into the tank 6, as shown in Figure 1.

The housing 70 is provided with a lateral extension forming a passage thereinto, which is threaded at its outer end at 72 to receive a pipe connection. At the lefthand of the cavity formed by the housing 70 is a threaded passage 73 in which is mounted a strainer unit 50 of any suitable construction forming an enclosure for the strainer element 74 and having a pipe connection member 75. The cavity in the housing 70 is formed at one end as a cylinder in which a piston 76 mounted on a piston rod 78 may operate. Attached on the piston rod and associated with the piston is a strainer pad 77. Threadedly mounted in the housing 70 at the other end of the cavity formed thereby is a tubular extension 36 which is so constructed as to form an internal seat for a valve disc 80 attached to a valve disc retainer 79. Piston rod 78 rests against, but is not secured to the valve disc retainer 79. A spring 81 is arranged in the tubular extension 36 so as to load the valve disc retainer and normally hold the valve disc 80 on its seat and all of the parts connected to the retainer 79 in the position shown. The end of the tubular extension 36 beyond the valve disc seat is provided with a series of apertures as shown so that fluid may enter it. The end of the extension is provided with a well and bore to guide the movements of the retainer 79.

With regard to the manual operator for the piston assembly its details of construction are more clearly apparent from Figure 6. Within an extension of the housing 70 is a longitudinally movable plunger 83 having a sliding fit with a bushing 87. Mounted on the plunger 83 is a spring retaining collar 85 and a wiper 86. Lying between these elements is a compression spring 84. The wiper 86 rests against axial projections on the end of the bushing 87, as will be seen from Figure 6. Encircling the plunger 83 at its right hand headed end is an O seal ring 88 and mounted in a groove on the plunger within the bushing is another O seal ring 89. Finally, there is an O seal ring 90 surrounding the bushing at its inner headed end. As is clear from Figure 6, the bushing 87 is threadedly mounted in the valve housing and when screwed up tightly against the O sealing ring 90 there is formed a fluidtight seal at this point. The O sealing ring 88 is clamped between the headed end of the plunger 83 and the end of bushing 87 under the pressure exerted by spring 84 on the plunger 83, forming a fluidtight seal at this point. An O ring 89 is provided in an annular groove in plunger 83 to seal against the inside of bushing 89. The end of the plunger extends exteriorly of the housing 70 in a position to be engaged by a cam 82 pivotally mounted on a transverse pivot pin 82' mounted in a pair of extensions on the housing 70, as shown. An operating handle 45 is secured to the cam 82.

Returning to Figure 1, it will be seen that the cavity in housing 70 is in communication with the liquid eduction line 37 attached in the threaded port 72 of the valve housing. In the line 37 is a cut-off valve 38. Included in line 37 is a strainer 39 which may be provided with a drain plug 41 in accordance with the usual practice. Line 37 extends to the intake side of the pump 42 which may be of any of the usual type of liquid pumps.

The liquid supply line 43 may be attached to the line 37 and have the usual coupling 44 to provide means for attaching it to the liquid source. In the line 43 there is preferably employed a check valve 46, a shut-off valve 47 and a bleed valve 48.

Attached to the discharge side of pump 42 is a dispensing line 49 which, of course, can be considered as a portion of return line 31. Connected in the line 49 is a pressure relief valve 57 which may be provided with a vent pipe 58 to vent liquids or vapors to the atmosphere when a predetermined pressure in line 49 is reached.

Line 49 is connected to the housing 70 of valve 29 through line 40 and the filter 50. Line 49 is also provided with a liquid return line 31 containing a shut-off valve 51 and a by-pass line 52 in which is preferably employed the pressure relief valve 53. Connected to line 49 on the discharge side of pump 42 is a surge chamber 54 having a cut-off valve 56 by means of which gases may be inserted or removed from chamber 54 where they act as a shock absorber for pulsations created by pump 42.

The pressure in line 49 can be measured by a pressure gauge 59 connected thereto by a branch which includes the excess flow valve 62 and the shut-off valve 61.

Line 49 which is the dispensing line is provided with an extension 63 preferably including a shut-off valve 64 and a coupling 66 to which a flexible hose 67 may be attached. Included in this hose is a check valve 71, a cut-off valve 69 and a coupling 68 forming the terminal thereof.

The operation of this system will now be described. Tank 6 may be filled with liquid without using a pump by connecting a liquid source of sufficient pressure to the coupling 44. With valves 47 and 38 open the liquid will pass through line 43, valve 47, check valve 46, line 37, valve 38, cavity of valve 29, through valve 80 which is unseated by the pressure, which valve will of course immediately close when the supply of liquid to line 43 is cut off and that line is vented through valve 48. This is the procedure which would normally be used for filling the tank.

In order to fill the tank with liquid by pumping valve 38 is closed. A source of liquid is attached to coupling 44. Valves 28, 47 and 51 are open. Valves 48, 56 and 64, of course, remain closed. Pump 42 is started and liquid passes through coupling 44, open valve 47, check valve 46, strainer 39, pump 42, line 49, line 31, valve 51, valve 28, and check valve 27 into the tank.

Liquid is dispensed while employing the return line 31 as follows. Valves 47, 56 and 64 are closed while valves 28, 38 and 51 are open. Pump 42 is started and when employing valve 29 of Figure 2, lever 45 is moved to the left which opens valve 80 through the agency of plunger 63. Liquid is then drawn through valve 80 into the cavity of housing 70, to line 37 and thence through strainer 39 to pump 42 and from there into line 49, and from there back into the tank through line 31 and valves 51, 28 and 27. The pressure in line 49 will force liquid through line 40 and filter 50 into the cylinder in housing 70 behind piston 76 which will hold valve 80 open so that the handle 45 can be released. In order to dispense liquid from line 49 valve 51 is closed. When the pressure in line 49 rises to the desired dispensing pressure the liquid which tends to create a higher pressure will be by-passed through the relief valve 53 and branch 52 to the tank through valves 28 and 27. The system is now ready for dispensing liquid and coupling 68 may be secured to the tank into which the liquid is to be dispensed. Valve 69 is then opened followed by the opening of valve 64, thus dispensing liquid into the tank to be filled. The gas pressure in the upper part of surge tank 54 will absorb the pressure pulsations of pump 42. Pressure relief valve 57 prevents breakage of line 49 but is not essential to a useful system as excess pressure will be relieved through the valve 53, as previously explained. Guage 59 gives a visible indication of the pressure conditions in line 49.

When the tank to be filled is full, valves 69 and 64 are closed. The pump is stopped and valve 51 is opened, whereupon the pressure in line 49 falls to tank pressure, and of course, the pressure in line 40 falls to a similar value so that spring 81 (Fig. 2) will close the valve 80.

The operation of this system is the same without the use of the return line 31 which operation results if valve 28 is closed, provided that pump 42 is so constructed that a pressure great enough to open relief valve 57 or to break line 49 cannot be generated, or if dispensing conduit coupling 68 is already attached to the tank to be filled and valves 64 and 69 are open. Under this operation when the tank to be filled is full the pump is stopped and valves 64 and 69 are closed. The pressure in lines 49 and 40 will then be insufficient to hold the valve 80 open against the action of spring 81.

The construction of the valve of Figures 3 and 4 will now be described. As shown, this valve comprises a housing 97 which is provided with a cap secured thereon by the bolts 99 and containing a cylinder 101. One end of this cylinder is closed by a flexible diaphragm 102 held in place by the cap. In the cylinder 101 is a piston 103 having a piston rod 104 engaging the head of valve 92. The other end of the piston 103 has an extension 106 which may be engaged by a plunger 107. This plunger is normally held away from the extension 106 by a spring 108 and is provided with a push button 109 for manual engagement. The cylinder 101 is provided with the threaded pressure fluid port 73, as before. The housing 97 has a tubular extension 32' integral in this case with the threaded connection 34 which joins the main housing at the fracture groove 34' as before. The extension 32' is closed by means of an apertured bushing 100 which guides the stem of valve 92. A compression spring 91 normally engages this valve on its seat and this valve is provided with a free passage 93.

This valve is of course to be substituted for the valve 29 of Figure 1 with pipe 37 connecting the threaded port 82, pipe 40 connecting the threaded port 73, preferably with the inclusion of the strainer 50 at the connection.

In the operation of the system using this valve the procedure is the same as that described when the valve 80 was initially operated by lever 45. In this case the equivalent button 109 is pushed forcing valve 92 off its seat.

Referring to Figure 5, this modification of the valve 29 includes a housing 101 having the threaded outlet port 82. This housing forms a chamber 112 in which is disposed a piston 113. The chamber 112 has an inlet 114 and a pressure inlet 115. A diaphragm of flexible material 116 forms one end of chamber 112 and is secured in place by a cap 117 having a pivot pin 118 mounted thereon. A slidable pin 119 is mounted in the cap 117 and is provided to operate piston 113 by pressure on diaphragm 116. A lever pivotally mounted on the pin 118 is arranged to actuate the pin 119. The stop pin 122 is provided to limit the outward movement of lever 121 under the force of the return spring 123.

The other end of the housing is provided with the threaded coupling extension 34 and weakness groove 34' as before. It is provided with a cap 124 forming a chamber 126 having openings 127 and 128. Valve seat 129 is provided at the end of the threaded extension 34 on which a quick closing valve head 131 may seat to close inlet 114. Valve head 131 is urged to its seat by spring 132 and the valve head is provided with a facing material 133 of a resilient nature suitable for a valve which is retained in place by a plate 134 and screw 136. Valve head 131 has a valve stem 137 to guide it in its movement. When this valve is used in the system of Figure 1, it is of course screwed into the tank as before, line 37 is connected to the inlet port 82, and line 40 is connected to the threaded port 115 which line may include a filter as before, if desired.

The operation of the system of Figure 1 when the valve of Figure 5 is substituted for valve 29 of Figure 1, in a manner apparent in view of the previous description of the operation of valves 29 and 97 is quite the same.

As to all modifications, should the quick closing valve such as the valve 29 be sheared off at the weakness groove 34', the quick closing valve head 32 will remain in place and will prevent the escape of liquid from the tank. Valve 80 in the case of Figure 2, and valve 131 in the case of Figure 5 will completely close the tank while valve 92 of Fig. 3 will substantially close it as very little liquid will bleed out through opening 93.

With reference to the valve of Figure 2 as supplemented by Figure 6, it is to be noted that the seal at the operating plunger 83 is different from the structure used to seal the valves of Figures 3 and 5 where the diaphragms 102 and 116 are employed. In the arrangement of Figures 2 and 6 the seal is effected by means of the three O rings previously described.

In view of the above description it will be apparent that the quick closing valves which comprise the subject matter of this invention are capable of modification as indicated by the three forms thereof herein illustrated. Further modification is possible, and I do not, therefore, desire to be limited by the disclosure but only as required by the claim granted me.

What is claimed is:

A quick closing valve comprising a housing forming a chamber, a cylinder at one end and an inlet spaced therefrom, means forming a seat at said inlet, said housing having an outlet for said chamber intermediate said cylinder and said inlet, a spring loaded valve for engaging said seat to normally close said inlet, a piston in said cylinder movable to unseat said valve, and manual means to unseat said valve comprising a headed push rod slidably mounted in an opening in one end of said cylinder, an O sealing ring mounted on said push rod and lying between the headed end thereof and the said end of the cylinder, a spring normally urging said push rod in a direction to compress said O sealing ring, and a flanged bushing threadedly mounted in said push rod opening and surrounding said rod and an O seal ring lying between the flange of said bushing and said end of said cylinder to form a seal, and a manually operated member mounted on said housing and operable to urge said push rod into engagement with said piston.

References Cited in the file of this patent

UNITED STATES PATENTS

| Number | Name | Date |
| --- | --- | --- |
| 80,066 | Gibson | July 21, 1858 |
| 312,077 | Bowen | Feb. 10, 1885 |
| 1,032,470 | Denneen | July 16, 1912 |
| 1,136,606 | Loyd | Apr. 20, 1915 |
| 1,339,798 | Thompson | May 11, 1920 |
| 1,373,599 | Clark | Apr. 5, 1921 |
| 1,381,765 | Thompson | June 14, 1921 |
| 1,473,303 | Lightford | Nov. 6, 1923 |
| 1,633,642 | Kramer | June 28, 1927 |
| 1,692,296 | Godsey | Nov. 20, 1928 |
| 1,957,567 | Williams | May 8, 1934 |
| 2,322,517 | Hose | June 22, 1943 |
| 2,538,806 | St. Clair | Jan. 23, 1951 |
| 2,563,244 | Holicer | Aug. 7, 1951 |